(12) United States Patent
Fujikata et al.

(10) Patent No.: US 10,274,757 B2
(45) Date of Patent: Apr. 30, 2019

(54) ELECTRO-OPTIC DEVICE

(71) Applicants: NEC Corporation, Minato-ku, Tokyo (JP); Photonics Electronics Technology Research Association, Bunkyo-ku, Tokyo (JP)

(72) Inventors: Junichi Fujikata, Tokyo (JP); Shigeki Takahashi, Tokyo (JP)

(73) Assignees: NEC CORPORATION, Tokyo (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/559,911

(22) PCT Filed: Feb. 17, 2016

(86) PCT No.: PCT/JP2016/000841
§ 371 (c)(1),
(2) Date: Sep. 20, 2017

(87) PCT Pub. No.: WO2016/157687
PCT Pub. Date: Oct. 6, 2016

(65) Prior Publication Data
US 2018/0074349 A1    Mar. 15, 2018

(30) Foreign Application Priority Data
Mar. 31, 2015   (JP) ................. 2015-071022

(51) Int. Cl.
*G02F 1/025* (2006.01)
*G02F 1/015* (2006.01)

(52) U.S. Cl.
CPC ...... *G02F 1/025* (2013.01); *G02F 2001/0152* (2013.01); *G02F 2201/063* (2013.01); *G02F 2202/10* (2013.01)

(58) Field of Classification Search
CPC .................................................. G02F 2201/063
See application file for complete search history.

(56) References Cited

U.S. PATENT DOCUMENTS 5,825,047 A     10/1998   Ajisawa et al.
2002/0054724 A1  5/2002   Tada et al.
(Continued)

FOREIGN PATENT DOCUMENTS

JP     H03-263388 A    11/1991
JP     2002-139717 A    5/2002
(Continued)

OTHER PUBLICATIONS

William M. J. Green et al., "Ultra-compact, low RF Power, 10Gb/s silicon Mach-Zehnder modulator" Optics Express, Dec. 10, 2007, vol. 15, No. 25, pp. 17106-17113.
(Continued)

*Primary Examiner* — Michelle R Connelly
(74) *Attorney, Agent, or Firm* — Sughrue Mion, PLLC (57) ABSTRACT

An electro-optic device includes a first semiconductor layer including the rib-type waveguide, which includes a rib part and a first slab part, which extends in a first direction from the rib part; a dielectric layer, which is formed on the rib part; a second semiconductor layer, which extends in a second direction, which is opposite to the first direction, from an upper surface of the dielectric layer; a first high-concentration impurity region, which is formed in the first semiconductor layer to be in contact with the first slab part on the first direction side; and a second high-concentration impurity region, which is formed in a region of the second semiconductor layer on the second direction side. The second high-concentration impurity region is formed in a region other than a region overlapping the first semiconductor layer in a lamination direction.

9 Claims, 8 Drawing Sheets

(56) References Cited

U.S. PATENT DOCUMENTS

| | | |
|---|---|---|
| 2004/0208454 A1 | 10/2004 | Montgomery et al. |
| 2005/0189591 A1 | 9/2005 | Gothoskar et al. |
| 2010/0215309 A1 | 8/2010 | Shubin et al. |
| 2011/0211786 A1 | 9/2011 | Ushida et al. |
| 2012/0033910 A1 | 2/2012 | Morini et al. |
| 2015/0055910 A1 | 2/2015 | Liang |
| 2015/0056740 A1 | 2/2015 | Menezo |
| 2016/0004104 A1* | 1/2016 | Feng ................ G02F 1/025 385/3 |
| 2016/0011439 A1 | 1/2016 | Kitamura et al. |
| 2016/0170241 A1* | 6/2016 | Adams ............... G02F 1/025 385/2 |
| 2016/0291350 A1 | 10/2016 | Fujikata et al. |

FOREIGN PATENT DOCUMENTS

| | | |
|---|---|---|
| JP | 2006-515082 A | 5/2006 |
| JP | 2007-525711 A | 9/2007 |
| JP | 2011-180595 A | 9/2011 |
| JP | 2012-521576 A | 9/2012 |
| JP | 2016-029469 A | 3/2016 |
| WO | 2014/155450 A1 | 2/2017 |

OTHER PUBLICATIONS

International Search Report for PCT Application No. PCT/JP2016/000841, dated May 10, 2016.
English translation of Written opinion for PCT Application No. PCT/JP2016/000841.

* cited by examiner

ELECTRO-OPTIC DEVICE

This application is a National Stage Entry of PCT/JP2016/000841 filed on Feb. 17, 2016, which claims priority from Japanese Patent Application 2015-071022 filed on Mar. 31, 2015, the contents of all of which are incorporated herein by reference, in their entirety.

TECHNICAL FIELD

This invention relates to an electro-optic device.

BACKGROUND ART

In recent years, passive devices, such as a silicon-based waveguide, an optical coupler, and a wavelength filter are researched very widely. Moreover, as an important technology for manipulating an optical signal for a communication system, active elements, such as a silicon-based optical modulator and an optical switch are attracting significant attention. Here, an optical switch and a modulation element, which use the thermo-optic effect in silicon to change a refractive index has a low speed, and can be used only with a modulation frequency (device speed) of about 1 Mb/sec. Therefore, in order to achieve a high modulation frequency required in many optical communication systems, an optical modulation element using an electro-optic effect is required.

One of electro-optic devices is a silicon-based optical communication device. The silicon-based optical communication device can be used with light having wavelengths of 1,310 nm and 1,550 nm, which are used in optical fibers for various systems, such as fiber-to-the-home and a local area network (LAN). Moreover, the silicon-based optical communication device can be realized, using the complementary metal oxide semiconductor (CMOS) technology, as an integrated circuit obtained by integrating optical functional elements and electronic circuits on a silicon platform. Therefore, the silicon-based optical communication device is a technology that is very promising for realizing an optical modulation element having a high modulation frequency.

Most related electro-optic devices (optical modulators) that have currently been proposed changes a free carrier density in a silicon layer using the carrier plasma effect to change a real part and an imaginary part of the refractive index, to thereby change a phase and an intensity of light. Here, pure silicon does not exhibit the linear electro-optic effect (Pockels effect). Moreover, a change in refractive index caused by the Franz-Keldysh effect and the Kerr effect in pure silicon is very small. Therefore, in the related electro-optic devices, the above-mentioned carrier plasma effect is widely used. Moreover, a modulator using free carrier absorption directly modulates output by changing absorption of light that propagates through silicon (Si). As the structure using a change in refractive index, the structure using a Mach-Zehnder interferometer is generally used. This structure generates a phase difference between optical signals passing through two arms, and multiplexes those optical signals to obtain a light intensity modulation signal.

The free carrier density in the electro-optic device can be changed by injecting, accumulating, removing, or inverting free carriers. However, most of such related devices that have currently been investigated have low optical modulation efficiency. Therefore, those related devices require a length on the order of mm for optical phase modulation, and require an injection current density of more than 1 kA/cm$^3$. Moreover, as an element size becomes larger, the electro-optic device becomes more likely to be affected by a temperature distribution on the silicon platform. Therefore, in the electro-optic device having a large size, a refractive index of the silicon layer is changed by the thermo-optic effect. As a result, with an optical phase modulator having low efficiency, there is assumed a situation in which the original electro-optic effect is canceled. Therefore, in order to achieve downsizing, higher integration, and lower power consumption, there is a need for the element structure with which high optical modulation efficiency can be obtained. The high optical modulation efficiency can be achieved to reduce an optical phase modulation length. In order to achieve the high optical modulation efficiency, it is desired that a region in which the carrier density is changed and controlled ideally be the same as an optical signal field.

Figure 1:
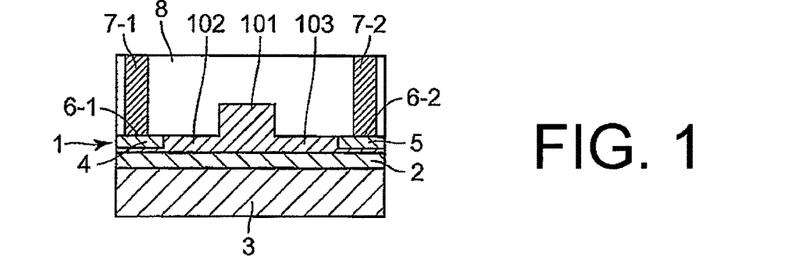
FIG. 1 is a cross-sectional view for illustrating the structure of an electro-optic device having the PIN structure according to Non Patent Document 1.

FIG. 1 is a view for illustrating a typical example of a silicon-based electro-optic phase modulator using the rib waveguide structure formed on a silicon-on-insulator (SOI) substrate, which is described in Non Patent Document 1. In this electro-optic phase modulator, slab regions 102 and 103 extending transversely on both sides of a rib shape formed of an intrinsic semiconductor region 101 are formed by being p-doped and n-doped, respectively. The above-mentioned rib waveguide structure is formed using an intrinsic semiconductor silicon layer 1 on the SOI substrate. The modulator illustrated in FIG. 1 is a positive intrinsic-negative (PIN) diode type modulator. This modulator has the structure in which a forward bias or a reverse bias is applied to change a free carrier density in the intrinsic semiconductor region 101 and hence generate the carrier plasma effect, to thereby change a refractive index of the region 101. In this example, the SOI substrate includes a support substrate 3, a buried oxide film 2 formed on the support substrate 3, and the intrinsic semiconductor silicon layer 1 formed on the buried oxide film 2. The intrinsic semiconductor silicon layer 1 includes a p-type region (p+-doped semiconductor silicon layer) 4, which is formed by doping at a high concentration, and a part of which forms a first electrical contact portion 6-1. In FIG. 1, the intrinsic semiconductor silicon layer 1 further includes an n-type region (n+-doped semiconductor silicon layer) 5, which is formed by n-type doping at a high concentration. A part of the p-type region 4 serves as the first electrical contact portion 6-1, and a part of the n-type region 5 serves as a second electrical contact portion 6-2. Electrode wirings 7-1 and 7-2 are connected to the electrical contact portions 6-1 and 6-2, respectively. The electrode wirings 7-1 and 7-2 are formed to pierce an oxide cladding 8, which is formed to cover the intrinsic semiconductor silicon layer 1. In the PIN diode structure, the p- and n-type regions 4 and 5 may be doped to exhibit a carrier density of about 1,020 per cm$^3$. Moreover, in the PIN structure, the p-type region 4 and the n-type region 5 are spaced apart on both sides of the intrinsic semiconductor silicon layer 1 having a rib shape.

When the forward bias is applied to the PIN diode through the first and second electrical contact portions 6-1 and 6-2, free carriers are injected into the waveguide. At this time, with the increase of the free carriers, a refractive index of the intrinsic semiconductor silicon layer 1 is changed. As a result, light transmitted through the waveguide is phase-modulated. However, the speed of this optical modulation operation is limited by free carrier lifetime in the intrinsic semiconductor silicon layer 1 having the rib shape and a carrier diffusion rate after the forward bias is removed. Such PIN diode phase modulator generally has an operation speed in a range of from 10 Mb/sec to 50 Mb/sec during the forward bias operation. In contrast, an operation speed after the forward bias is removed is extremely low. Impurities may be introduced into the silicon layer to shorten the carrier lifetime, to thereby increase a switching speed. However, the introduced impurities reduce the optical modulation efficiency. In addition, the most significant factor affecting the operation speed is the RC time constant. In this PIN diode phase modulator, a capacitance (C) at the time when the forward bias is applied is very large because of a reduction of a carrier depletion layer of a PN junction. Theoretically, it is possible to achieve a high-speed operation by applying the reverse bias to the PN junction. However, a relatively large drive voltage or a large element size is required therefor.

Incidentally, in Patent Document 1, there is described a silicon-based electro-optic modulator, which is formed of a body region of a second conductivity type, and a gate region of a first conductivity type, which is laminated to partially overlie the body region, and in which a relatively thin dielectric layer is formed at an interface of the lamination. Also in Patent Document 2, an SOI-based optical arrangement having the similar structure is described.

Figure 2:
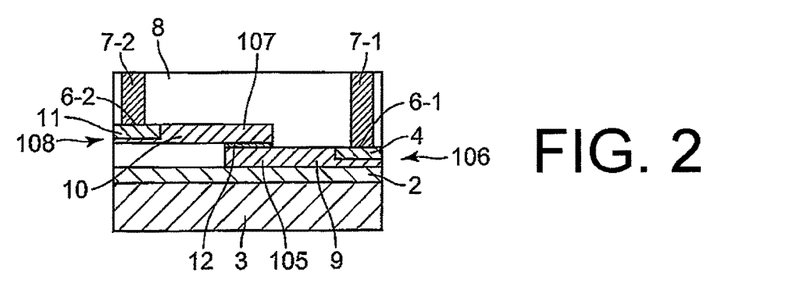
FIG. 2 is a cross-sectional view for illustrating the structure of an electro-optic device having the SIS structure according to Patent Document 1.

FIG. 2 is a view for illustrating a silicon-based electro-optic modulator having a silicon-insulator-silicon (SIS) type structure of the above-mentioned type. In FIG. 2, constituent elements equivalent to the constituent elements of FIG. 1 are denoted by the same reference numerals.

The silicon-based electro-optic modulator of FIG. 2 is formed on an SOI platform. A body region 105 of the silicon-based electro-optic modulator is formed in an intrinsic semiconductor silicon layer 106 of the SOI substrate. Moreover, a gate region 107 is formed in a polysilicon layer 108, which is laminated to form the SOI structure. A dielectric layer 12 is arranged between the body region 105 and the gate region 107. The silicon layer 106 and the polysilicon layer 108 are doped to form p-doped semiconductor silicon (first silicon semiconductor layer 9) and n-doped polysilicon (second silicon semiconductor layer 10), respectively. Moreover, the silicon layer 106 and the polysilicon layer 108 includes the p-type region 4 and an n-type region (n+-doped polysilicon layer) 11, which are doped at a high concentration, respectively. A part of the first silicon semiconductor layer 9 and a part of the second silicon semiconductor layer 10 serve as the body region 105 and the gate region 107, respectively. In those doped regions, the carrier density is changed by an external signal voltage. In other words, the carrier density of the doped regions can be dynamically and externally controlled. On both sides of the dielectric layer 12, free carriers are accumulated, removed, or inverted to phase-modulate the light passing through the body region 105. In order to efficiently achieve the phase modulation, it is desired that the region in which the carrier density is dynamically and externally controlled ideally be the same as the optical signal field. However, in reality, the region in which the carrier density is dynamically changed has very small thickness of about several ten nm as compared to the spread of the optical signal field. Therefore, in order to achieve desired optical phase modulation, an optical modulation length (length in the front-and-back direction of FIG. 2) on the order of mm is required. As a result, the size of the electro-optic device is increased, and the high-speed operation becomes difficult.

Figure 3:
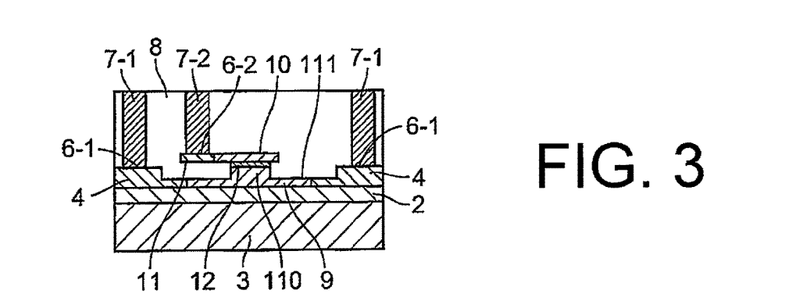
FIG. 3 is a cross-sectional view for illustrating the structure of an electro-optic device according to Patent Document 3.

Moreover, in Patent Document 3, a silicon-based electro-optic device (metal oxide semiconductor (MOS) type Si modulator) is described. In this electro-optic device, a laminate structure of a first silicon semiconductor layer of a first conductivity type and a second silicon semiconductor layer of a second conductivity type has a rib waveguide shape to form an optical confinement region. Moreover, as illustrated in FIG. 3, this electro-optic device includes, in a slab part 111 of a rib-type waveguide 110, a region to which the electrode wiring (metal electrode) 7-1 is connected. In this region to which the electrode wiring 7-1 is connected, a thickness of the slab part 111 is larger than a thickness of the surrounding slab part 111. Further, the regions to which the electrode wirings 7-1 and 7-2 are connected are formed in a range of thickness in which, when a distance from the regions to the rib-type waveguide 110 is changed, an effective refractive index of the rib-type waveguide 110 in a zeroth-order mode does not change.

In this silicon-based electro-optic device, it needs to be ensured that interference does not occur between an electrode layer (not shown) electrically connected to the first silicon semiconductor layer 9 of the first conductivity type and an electrode layer (not shown) electrically connected to the second silicon semiconductor layer 10 of the second conductivity type. In other words, the electrode layer electrically connected to the first silicon semiconductor layer 9 needs to be formed at a position that is spaced apart from the electrode layer electrically connected to the second silicon semiconductor layer 10. Here, when the electrode layer electrically connected to the second silicon semiconductor layer 10 of the second conductivity type is arranged near the rib-type waveguide 110 (center side in FIG. 3), an optical loss is increased. Therefore, the electrode layer electrically connected to the second silicon semiconductor layer 10 of the second conductivity type needs to be spaced apart from the rib-type waveguide 110 to a certain extent. Therefore, the electrode layer connected to the first silicon semiconductor layer 9 needs to be formed at a position that is spaced further away from the rib-type waveguide 110. As a result, a wiring distance from the first silicon semiconductor layer 9 to the electrode layer is increased, and an extraction resistance is increased.

PRIOR ART DOCUMENT(S)

Patent Document(s)

Patent Document 1: JP 2006-515082 A
Patent Document 2: JP 2007-525711 A
Patent Document 3: JP 2011-180595 A Non Patent Document(s)

Non Patent Document 1: William M. J. Green, Michael J. Rooks, Lidija Sekaric, and Yurii A. Vlasof, Opt. Express 15, 17106-171113 (2007), "Ultra-compact, low RF power, 10 Gb/s silicon Mach-Zehnder modulator"

SUMMARY OF THE INVENTION

Problem to be Solved by the Invention

As described above, the electro-optic devices described in Non Patent Document 1 and Patent Documents 1 to 3 have several problems. For example, with a silicon-based electro-optic device that can be integrated on a Si substrate, it is difficult to achieve all of reduced cost, reduced current density, reduced power consumption, high degree of modulation, low-voltage driving, and high-speed modulation. It is especially difficult to realize the optical modulator structure based on the carrier plasma effect that can achieve those objects in a sub-micron range.

Moreover, with the MOS type Si modulator described in Patent Document 3, downsizing and reduced voltage are achieved, but there are still the following needs. Specifically, there are required reduction of the extraction resistance and a reduced optical loss with a thin Si layer that is coupled to a rib-type Si waveguide with high efficiency to increase modulation efficiency, and forms poly-Si and a slab layer in the rib-type waveguide.

Through continuous extensive research in search for an answer to the above-mentioned problems and needs, the inventors of this invention have found that solving the following problems can provide a solution or improvement for the above-mentioned problems and needs.

Specifically, in the silicon-based electro-optic device described in Patent Document 3, the n-type region 11 of the second silicon semiconductor layer 10 of the second conductivity type is formed to overlie the first silicon semiconductor layer 9 of the first conductivity type (and the p-type region 4) in a lamination direction. Here, in order to reduce an electrode extraction resistance, the p-type region 4 formed in the first silicon semiconductor layer 9 extends toward the rib-type waveguide 110 to under the n-type region 11. With this structure, when annealing is performed at a high temperature to form the n-type region 11, impurities may be diffused to the first silicon semiconductor layer 9 undesirably. Then, the diffusion of the impurities affects an electrical resistance of the p-type region 4. In addition, when the annealing temperature in forming the n-type region 11 is reduced to avoid the above-mentioned situation, a sufficient annealing effect cannot be obtained in the n-type region 11. As described above, the silicon-based electro-optic device described in Patent Document 3 has a problem in that it is difficult to perform appropriate annealing in forming a high-concentration impurity introduction region.

It is an object of this invention to provide a technology for solving the above-mentioned problems, and to provide an electro-optic device having the structure that includes a rib-type waveguide, and allows annealing suitable for forming a high-concentration impurity introduction region.

Means to Solve the Problem

An electro-optic device according to one aspect of this invention is characterized by comprising a first semiconductor layer including a rib-type waveguide, which includes a rib part and a first slab part, which extends in a first direction from the rib part; a dielectric layer, which is formed on the rib part; a second semiconductor layer, which extends in a second direction, which is opposite to the first direction, from an upper surface of the dielectric layer; a first high-concentration impurity region, which is formed in the first semiconductor layer to be in contact with the first slab part on the first direction side; and a second high-concentration impurity region, which is formed in a region of the second semiconductor layer on the second direction side other than a region overlapping the first semiconductor layer in a lamination direction.

Effect of the Invention

According to this invention, there can be provided the electro-optic device having the structure that includes the rib-type waveguide, and allows annealing suitable for forming the high-concentration impurity introduction region.

MODES FOR EMBODYING THE INVENTION

Now, embodiments of this invention are described in detail.

An electro-optic device according to embodiments of this invention is specifically a silicon-based electro-optic modulator configured to convert a high-speed electrical signal, which is required in information processing and communication fields, into an optical signal at high speed. In order to achieve a sufficiently high-speed operation, this electro-optic device uses the capacitor structure made of silicon-insulator-silicon formed on a silicon-on-insulator (SOI) substrate.

An electro-optic device according to a first embodiment of this invention has the structure in which a first semiconductor layer (first silicon semiconductor layer), which is doped to exhibit a first conductivity type, and at least a part of a second semiconductor layer (second silicon semiconductor layer), which is doped to exhibit a second conductivity type, are laminated. The first silicon semiconductor layer is processed into a rib waveguide shape, and the second silicon semiconductor layer is laminated at least on the rib part of the first silicon semiconductor layer. Between the first silicon semiconductor layer and the second silicon semiconductor layer that are laminated, a relatively thin dielectric layer is formed to form a so-called semiconductor-insulator-semiconductor (SIS) type junction. The phrase "relatively thin dielectric layer" means a dielectric layer of about 10 nm or less.

In the SIS type junction, electrical signals from electrical terminals coupled to the first and second silicon semiconductor layers accumulate, remove, or invert free carriers on both sides of the relatively thin dielectric layer. In other words, the electro-optic device according to the first embodiment is an electro-optic device using modulation of a free carrier concentration sensed by an electric field of an optical signal passing through the rib part of the first silicon semiconductor layer. A rib waveguide shape is designed so that a region having a peak intensity of an optical signal field is arranged in a region in which the free carriers are accumulated, removed, or inverted on both sides of the dielectric layer.

As described above, the first silicon semiconductor layer is processed into the rib waveguide shape. The rib waveguide shape is formed by the rib part and a slab part adjacent thereto. Then, the rib part serves as a rib waveguide. The first silicon semiconductor layer further includes a first electrical contact portion that is adjacent to the slab part, and is doped at a high concentration.

Moreover, the above-mentioned dielectric layer is formed in an upper region of the rib part of a rib-type waveguide formed of the first silicon semiconductor layer. The second silicon semiconductor layer is laminated on the dielectric layer. The second silicon semiconductor layer has a region that extends laterally more than the dielectric layer. A part of the region that extends laterally is doped at a high concentration to form a second electrical contact portion.

Further, the first electrical contact portion and the second electrical contact portion are formed respectively on the left and right with respect to a light propagation direction in the rib-type waveguide.

In the first embodiment, the slab parts in the rib waveguide shape may be provided on both sides of the rib part. However, it is desired that a length (length in the direction of extending laterally from the rib part) of one slab part, that is, a slab part located on the side opposite to the first electrical contact portion be 1 µm or less. Through reduction of the length of the slab part, the spread of electric field distribution at the time when a voltage is applied to the first silicon semiconductor layer and the second silicon semiconductor layer can be suppressed. As a result, a silicon-based electro-optic device that is operable with a lower voltage can be realized.

Moreover, in the first embodiment, a height of the first electrical contact portion may be set to be equal to a height of the rib part of the rib waveguide shape. As a result, an electrode extraction resistance for connection from an optical phase modulation portion having the rib waveguide shape to an electrode through the slab part can be reduced, and easiness of production and production margin can be improved.

Further, in the first embodiment, a $Si_{1-x}Ge_x$ layer formed of at least one layer exhibiting the first conductivity type may be formed to be at least partially buried in an upper region of the rib part of the first silicon semiconductor layer.

As a result, the carrier plasma effect is improved, and the above-mentioned silicon-based electro-optic device with a smaller size and a lower voltage can be realized.

Further, in the first embodiment, the dielectric layer may be formed of one kind selected from the group consisting of silicon oxide, silicon nitride, hafnium oxide, zirconium oxide, and a rare earth oxide, or an alloy or a laminated film made of at least two kinds thereof.

In addition, in the first embodiment, each of the first and the second silicon semiconductor layers may be a layer formed of at least one layer selected from the group consisting of polycrystaline silicon, amorphous silicon, strained silicon, single crystal silicon, and $Si_{1-x}Ge_x$.

Further, in the first embodiment, the electrical terminals may be arranged to reduce an optical signal loss, and to provide a low series resistance.

Now, before describing the particular exemplary structure of a silicon-based electro-optic device according to another embodiment of this invention, an overview of a modulation mechanism in silicon is described. Some electro-optic devices according to embodiments of this invention to be described later relate to the modulation structure, but the silicon-based electro-optic device according to this invention uses an electro-optic effect (free carrier plasma effect) described below.

As described above, in pure silicon, no or very small, if at all, electro-optic effect occurs. Therefore, in a silicon-based optical modulator, the free carrier plasma effect and the thermo-optic effect are effective in an optical modulation operation. For a high-speed operation (Gb/sec or more), which is an object of the embodiments of this invention, the free carrier plasma effect is especially effective. The free carrier plasma effect is described as a first-order approximation value of the following relational expressions.

$$\Delta n = -\frac{e^2\lambda^2}{8\pi^3 c^3 \varepsilon_0 n}\left(\frac{\Delta N_e}{m_e} + \frac{\Delta N_h}{m_h}\right) \quad \text{[Expression 1]}$$

$$\Delta k = -\frac{e^3\lambda^2}{8\pi^3 c^3 \varepsilon_0 n}\left(\frac{\Delta N_e}{m_e^2\mu_e} + \frac{\Delta N_h}{m_h^2\mu_h}\right) \quad \text{[Expression 2]}$$

In the expressions 1 and 2, $\Delta n$ and $\Delta k$ represent a real part and an imaginary part of a change in refractive index of a silicon layer. Moreover, e represents an electric charge, $\lambda$ represents an optical wavelength, $\varepsilon_0$ represents a dielectric constant in vacuum, and n represents a refractive index of intrinsic semiconductor silicon. Moreover, $m_e$ represents an effective mass of electron carriers, and $m_h$ represents an effective mass of hole carriers. Moreover, $\mu_e$ represents a mobility of the electron carriers, and $\mu_h$ represents a mobility of the hole carriers. Further, $\Delta N_e$ represents a change in concentration of the electron carriers, and $\Delta N_h$ represents a change in concentration of the hole carriers.

From the above-mentioned expressions, it can be understood that through reduction of the effective masses of the electron and hole carriers, that is, through application of the $Si_{1-x}Ge_x$ layer or the like, a larger change in refractive index can be obtained.

However, the application of the $Si_{1-x}Ge_x$ layer increases an optical absorption loss. In other words, modulation efficiency and an optical loss are in a tradeoff relationship. In order to alleviate the tradeoff problem, a plurality of $Si_{1-x}Ge_x$ layers having different compositions may be laminated on the silicon layer, and a $Si_{1-x}Ge_x$ layer having a large Ge content may be arranged in an optical core region.

Alternatively, the $Si_{1-x}Ge_x$ layer may be composition-modulated, and a $Si_{1-x}Ge_x$ layer having a large Ge content may be arranged in the optical core region. As a result, the tradeoff problem between the modulation efficiency and the optical loss can be alleviated.

Moreover, experimental evaluations of the electro-optic effect in silicon have been performed, and it has been found that a change in refractive index with respect to a carrier density at wavelengths of 1,310 nm and 1,550 nm, which are used in an optical communication system, is a good match with the Drude expression. In addition, in an electro-optic modulator using the finding, an amount of phase change is defined by the following expression.

$$\Delta\theta = \frac{2\pi}{\lambda}\Delta n_{eff} L \qquad \text{[Expression 3]}$$

In the expression 3, L represents a length of an active layer along a light propagation direction of the electro-optic modulator.

It can be said that the amount of phase change in the electro-optic device according to the embodiments of this invention is relatively large considering an amount of light absorption thereof. Further, the electro-optic device according to the embodiments to be described below basically exhibits features of a phase modulator.

Now, embodiments of this invention are described in more detail with reference to the accompanying drawings. As described below, the electro-optic device according to each of the embodiments is an electro-optic phase modulator, in which silicon semiconductor-dielectric layer-silicon semiconductor (SIS) junction is formed on the SOI substrate, and which uses the free carrier plasma effect.

As described above, the electro-optic devices having the PIN structure and the SIS structure illustrated in FIG. 1 and FIG. 2 have disadvantages in that there is a small overlap between an optical field and a region in which the carrier density is modulated, and that sizes of the electro-optic devices are increased. Moreover, with the electro-optic device having the SIS structure illustrated in FIG. 3, electrode layers respectively connected to the first silicon semiconductor layer of the first conductivity type and the second silicon semiconductor layer of the second conductivity type need to be arranged at positions spaced apart from each other so that the electrode layers do not interfere with each other. Therefore, there is a problem in that an extraction resistance from the first silicon semiconductor layer to the electrode layer is high. Meanwhile, in order to at least partially solve this problem, when the electrode layer connected to the second silicon semiconductor layer is brought closer to the rib-type waveguide, there arises a problem in that the optical loss is increased.

Figure 4:
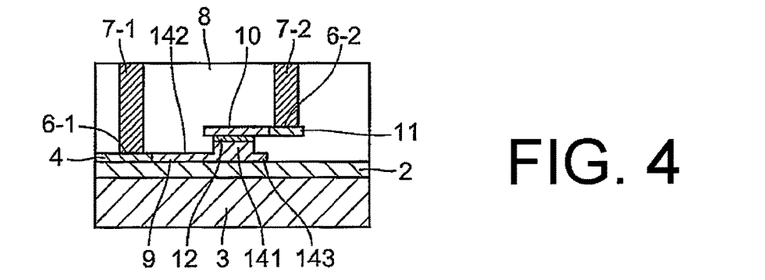
FIG. 4 is a cross-sectional view for illustrating the structure of an electro-optic device according to a first embodiment of this invention.

In order to improve at least some of the problems (disadvantages and challenges) inherent in those electro-optic devices illustrated in FIG. 1 to FIG. 3, the electro-optic device according to the first embodiment of this invention adopts the structure illustrated in FIG. 4.

The structure illustrated in FIG. 4 includes the structure in which a first silicon semiconductor layer 9, which is doped to exhibit a first conductivity type, and at least a part of a second silicon semiconductor layer 10, which is doped to exhibit a second conductivity type, are laminated. Then, between those laminated semiconductor layers, a relatively thin dielectric layer (insulating film) 12 is formed to form semiconductor-insulator-semiconductor (SIS) type junction.

In this SIS type structure portion, electrical signals from electrode wirings 7-1 and 7-2, which are electrical terminals coupled to the first and second silicon semiconductor layers 9 and 10, accumulate, remove, or invert the free carriers on both sides of the dielectric layer 12. As a result, a free carrier concentration felt by an electric field of an optical signal passing through the SIS type structure portion is modulated.

The first silicon semiconductor layer 9 is processed into the rib waveguide shape. In other words, the first silicon semiconductor layer 9 includes a rib part 141, and first and second slab parts 142 and 143 extending on both sides of the rib part 141. The rib part 141 extends in the front-and-back direction of FIG. 4, and serves as an optical waveguide (rib-type waveguide). The first slab part 142 extends (or stretches) in the left direction (first direction) of FIG. 4, and the second slab part 143 extends (stretches) in the right direction (second direction) of FIG. 4. The second slab part 143 may be very short as compared to the first slab part 142 with respect to the left-and-right direction of FIG. 4, or no second slab part 143 may be provided.

The first silicon semiconductor layer 9 further includes a p-type region 4, which is doped at a high concentration, adjacent to the first slab part 142. A part of the p-type region 4 serves as a first electrical contact portion 6-1.

The dielectric layer 12 is formed on an upper surface of the rib part 141 formed of the first silicon semiconductor layer 9. The second silicon semiconductor layer 10 is laminated to extend laterally on and beyond an upper surface of the dielectric layer 12. The second silicon semiconductor layer 10 is formed to extend (stretch) mainly in the second direction. A portion (region toward the second direction) of the second silicon semiconductor layer 10 includes an n-type region 11, which is doped with impurities at a high concentration. A part of the n-type region 11 serves as a second electrical contact portion 6-2.

As can be readily understood from FIG. 4, the first electrical contact portion 6-1 and the second electrical contact portion 6-2 are formed respectively on the left and the right with respect to the light propagation direction (approximately in the center of FIG. 4 in the front-and-back direction of the drawing sheet) in the rib-type waveguide. In other words, the first electrical contact portion 6-1 is located in the first direction with respect to the rib-type waveguide, and the second electrical contact portion 6-2 is located in the second direction with respect to the rib-type waveguide. Moreover, the second electrical contact portion 6-2 (n-type region 11) is formed in a region other than a region overlapping the first silicon semiconductor layer 9 in a lamination direction. In other words, the second electrical contact portion 6-2 (n-type region 11) is formed above the region in which the first silicon semiconductor layer 9 is not formed.

In this structure, the first silicon semiconductor layer 9 does not exist below the n-type region 11 in the lamination direction. Therefore, even when annealing is performed at a high temperature in forming the n-type region 11, there is no or small effect on the first silicon semiconductor layer 9 due to undesirable diffusion of the impurities. It can be said at least that there is substantially no effect on the p-type region 4. Therefore, in forming the n-type region 11, annealing can be performed at a sufficiently high temperature. As a result, a defect in crystal lattice that is generated in the n-type region 11 accompanying the introduction of the impurities can be sufficiently repaired. In addition, an electrical resistance (electrode extraction resistance) of a power supply path including the p-type region 4 is not substantially increased. As a result, satisfactory characteristics as the electro-optic device can be obtained.

Moreover, in this structure, the first electrical contact portion 6-1 and the second electrical contact portion 6-2 are arranged on the left and the right of the rib-type waveguide, respectively. Therefore, with this structure, as compared to the electro-optic device having the SIS type junction structure illustrated in FIG. 3, the first electrical contact portion 6-1 may be brought remarkably closer to the rib-type waveguide. As a result, the electrode extraction resistance can be reduced, and the high-speed operation can be achieved.

Figure 5:
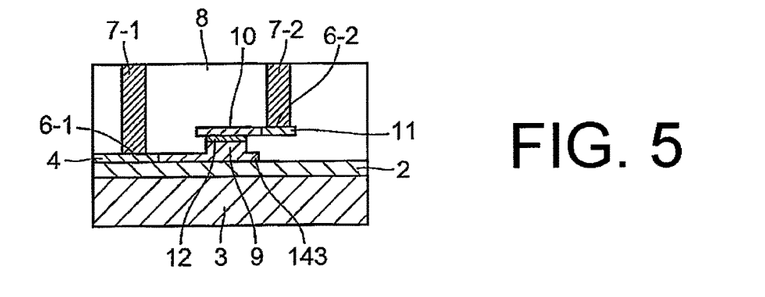
FIG. 5 is a cross-sectional view for illustrating the structure of an electro-optic device according to a second embodiment of this invention.

FIG. 5 is a view for illustrating the structure of an electro-optic device according to a second embodiment of this invention. Though it is hard to see in FIG. 5, in this electro-optic device, a length of the second slab part 143 in the rib waveguide shape is set to 1 µm or less. There may be no second slab part 143, but in order to make an intensity distribution (cross-sectional shape) of light passing through the rib-type waveguide closer to left and right symmetry, a length of about 1 µm is required. Meanwhile, the existence of the slab part 143 spreads an electric field generated by a voltage applied to the first silicon semiconductor layer 9 to deteriorate modulation characteristics. Therefore, as a compromise for the tradeoff, it is preferred to set the length of the slab part 143 to 1 µm or less. In this manner, coupling with optical fibers or the like to an input side and an output side of the electro-optic device may be performed satisfactorily, and the spread of the electric field distribution by the applied voltage may be suppressed. As a result, the electro-optic device that is operable with a lower voltage can be realized.

Figure 6:
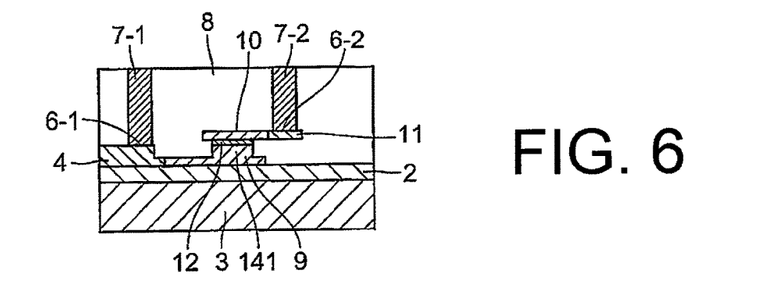
FIG. 6 is a cross-sectional view for illustrating the structure of an electro-optic device according to a third embodiment of this invention.

FIG. 6 is a view for illustrating the structure of an electro-optic device according to a fourth third embodiment of this invention. In this electro-optic device, in the first silicon semiconductor layer 9, a part (including the electrical contact portion 6-1) of the p-type region 4 has a thickness that is equal to that of the rib part 141. In other words, the first electrical contact portion 6-1 has a height that is equal to that of the rib part 141 in the rib waveguide shape. As a result, the electrode wiring 7-1 may be shortened to reduce the electrode extraction resistance, that is, a series resistance component, to thereby reduce the RC time constant. Therefore, this electro-optic device is capable of operation at higher speed while maintaining high optical modulation efficiency as compared to this electro-optic device of FIG. 5.

Further, a thickness of the second silicon semiconductor layer 10 may be adjusted to improve a shape and width of an overlapping range between the optical field and the region in which the carrier density is modulated. As a result, the electro-optic device may be downsized.

When a region in which a doping density is increased and the optical field overlap, the optical absorption loss is increased. In all of the above-mentioned embodiments, the optical waveguide having the rib (or ridge) shape is adopted, and the region in which the doping density is increased is provided in a region that is in contact with the first slab part 142. As a result, the electro-optic device that has a small optical loss and a small RC time constant, and operates at high speed can be obtained. Moreover, with this structure, excitation of higher-order light propagation mode, which occurs when the first electrical contact portion 6-1 having the height that is equal to that of the rib part is brought closer to the rib part 141 side, may be suppressed.

Figure 7:
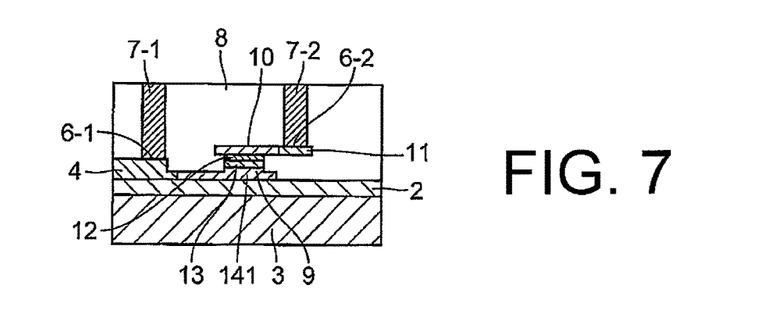
FIG. 7 is a cross-sectional view for illustrating the structure of an electro-optic device according to a fourth embodiment of this invention.
Figure 8:
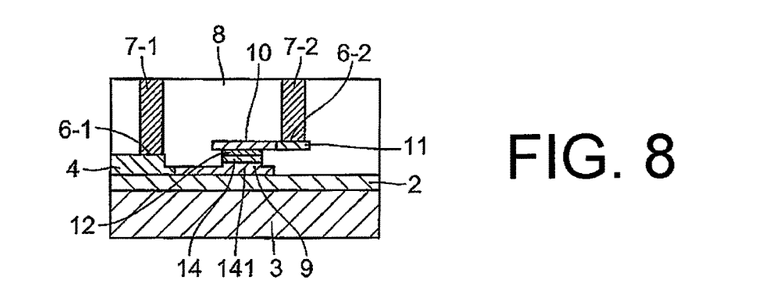
FIG. 8 is a cross-sectional view for illustrating the structure of an electro-optic device according to a fifth embodiment of this invention.

FIG. 7 and FIG. 8 are views for illustrating the structures of electro-optic devices according to fourth and fifth embodiments of this invention, respectively. The electro-optic device illustrated in FIG. 7 includes a $Si_{1-x}Ge_x$ (x=0.01 to 0.9) layer 13 in an upper region of the rib part 141. Similarly, the electro-optic device illustrated in FIG. 8 includes a $Si_{1-x}Ge_x$ laminated layer 14, in which two or more $Si_{1-x}Ge_x$ (x=0.01 to 0.9) layers (having different composition ratios) are laminated, in an upper region of the rib part 141. The $Si_{1-x}Ge_x$ layer 13 or the $Si_{1-x}Ge_x$ laminated layer 14 is formed to be at least partially buried in the rib part 141.

According to the fourth and fifth embodiments, provision of the $Si_{1-x}Ge_x$ layer 13 or the $Si_{1-x}Ge_x$ laminated layer 14 may further increase the modulation efficiency. In order to increase the modulation efficiency, it is desired that, with respect to a thickness W of the semiconductor layers in which the free carriers are accumulated, removed, or inverted on both sides of the dielectric layer 12, each of the $Si_{1-x}Ge_x$ (x=0.01 to 0.9) layer 13 and the $Si_{1-x}Ge_x$ laminated layer 14 have a thickness of 2 W or less. The modulation efficiency is improved when the thickness of the $Si_{1-x}Ge_x$ layer 13 or the $Si_{1-x}Ge_x$ laminated layer 14 is 2 W or more, but it is desired that the thickness be 2 W or less for higher effectiveness.

Figure 9:
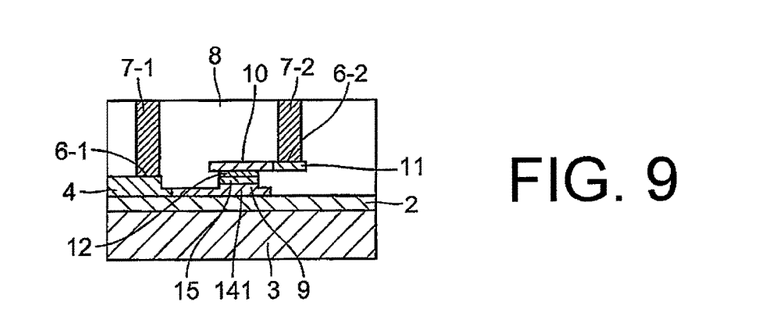
FIG. 9 is a cross-sectional view for illustrating the structure of an electro-optic device according to a sixth embodiment of this invention.

FIG. 9 is a view for illustrating the structure of an electro-optic device according to a sixth embodiment of this invention. In the sixth embodiment, a composition-modulated $Si_{1-x}Ge_x$ (x=0.01 to 0.9) layer 15, in which a composition is changed (which is composition-modulated) in a thickness direction, is formed in an upper region of the rib part 141. This composition-modulated $Si_{1-x}Ge_x$ layer 15 is composite-modulated in the thickness direction so that a larger Ge content is located on the lower layer side. With arrangement of the layer having a large Ge content in the optical core region, the optical modulation efficiency may be improved, and an increase in optical loss may be reduced.

Figure 10:
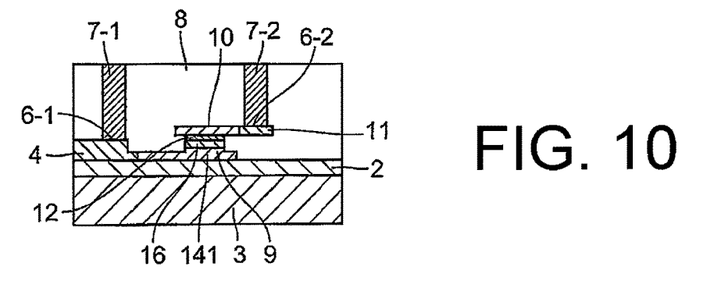
FIG. 10 is a cross-sectional view for illustrating the structure of an electro-optic device according to a seventh embodiment of this invention.

FIG. 10 is a view for illustrating the structure of an electro-optic device according to a seventh embodiment of this invention. In the seventh embodiment, a strained $Si_{1-x}Ge_x$ (x=0.01 to 0.9) layer 16, to which lattice strain is introduced, is formed in an upper region of the rib part 141. With the introduction of the lattice strain to the strained $Si_{1-x}Ge_x$ layer 16, effective masses of the carriers are reduced, and higher optical modulation efficiency can be obtained.

Figure 11:
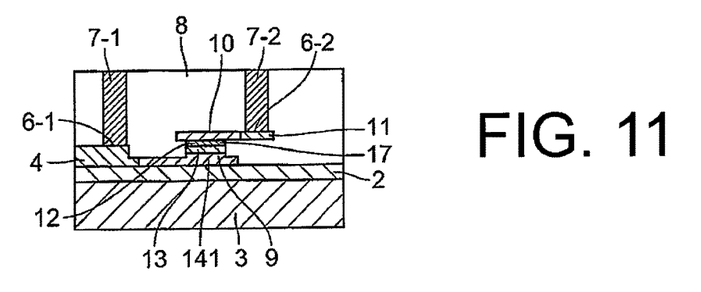
FIG. 11 is a cross-sectional view for illustrating the structure of an electro-optic device according to an eighth embodiment of this invention.

FIG. 11 is a view for illustrating the structure of an electro-optic device according to an eighth embodiment of this invention. In the eighth embodiment, an oxidized or nitrided $Si_{1-x}Ge_x$ layer 17 is formed on an upper surface of the $Si_{1-x}Ge_x$ (x=0.01 to 0.9) layer 13. This oxidized or nitrided $Si_{1-x}Ge_x$ layer 17 is formed by, after forming the $Si_{1-x}Ge_x$ layer 13, oxidizing or nitriding a surface of the $Si_{1-x}Ge_x$ layer 13. This oxidized or nitrided $Si_{1-x}Ge_x$ layer 17 may be configured to form a part or all of the dielectric layer 12. As a result, a defect density at an interface between the $Si_{1-x}Ge_x$ (x=0.01 to 0.9) layer 13 and the dielectric layer 12 is reduced, and more stable optical phase modulation operation is obtained.

A maximum thickness W of a depletion layer generated in the electro-optic device according to each of the above-mentioned embodiments is given by the following mathematical expression in a thermal equilibrium state.

$$W = 2\sqrt{\frac{\epsilon_s kT \ln\left(\frac{N_c}{n_i}\right)}{e^2 N_c}} \quad \text{[Expression 4]}$$

In the expression 4, $\epsilon_s$ represents a dielectric constant of a semiconductor layer, k represents a Boltzmann constant, $N_c$ represents a carrier density, $n_i$ represents an intrinsic carrier concentration, and e represents an amount of electric charges. For example, when $N_c$ is 1,017/cm$^3$, the maximum thickness of the depletion layer is about 0.1 µm. Then, with an increase in carrier density, the thickness of the depletion layer, that is, the thickness of the region in which the carrier density is modulated is reduced.

In each of the above-mentioned embodiments, each of the first and second silicon semiconductor layers 9 and 10 is formed of at least one layer selected from the group consisting of polysilicon, amorphous silicon, strained silicon, single crystal silicon, and $Si_{1-x}Ge_x$.

Figure 12:
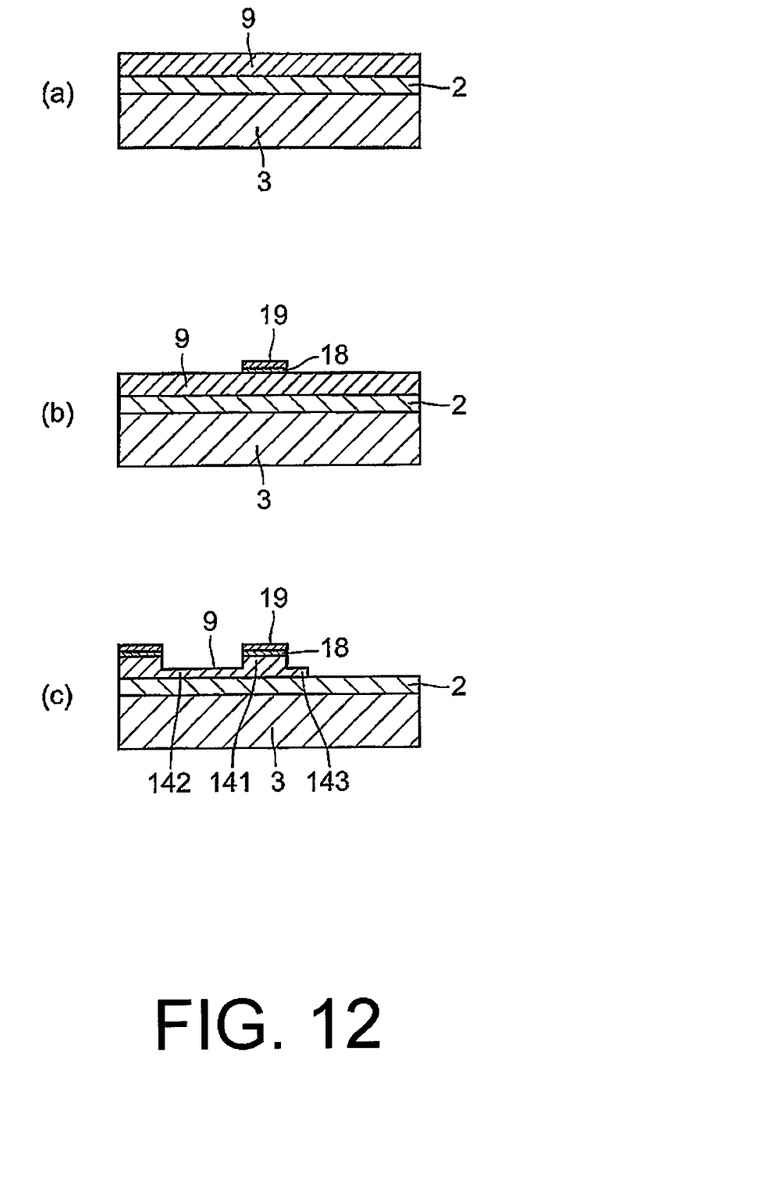
FIG. 12A, FIG. 12B, and FIG. 12C are cross-sectional views for illustrating a process of producing the electro-optic device according to the third embodiment of this invention in order of steps.
Figure 13:
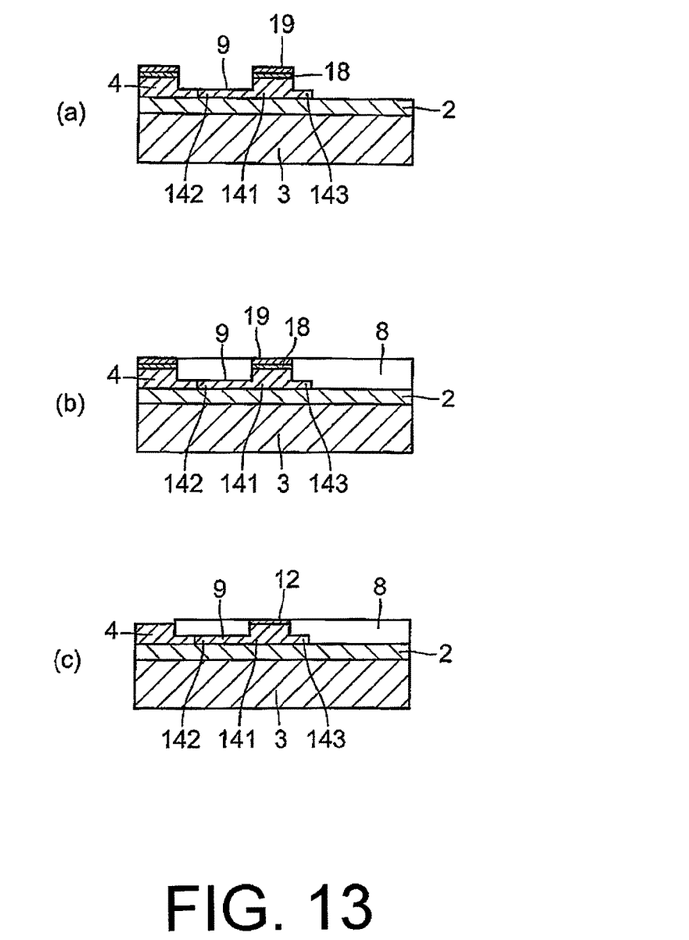
FIG. 13A, FIG. 13B, and FIG. 13C are cross-sectional views for illustrating steps following the steps illustrated in FIG. 12A to FIG. 12C.
Figure 14:
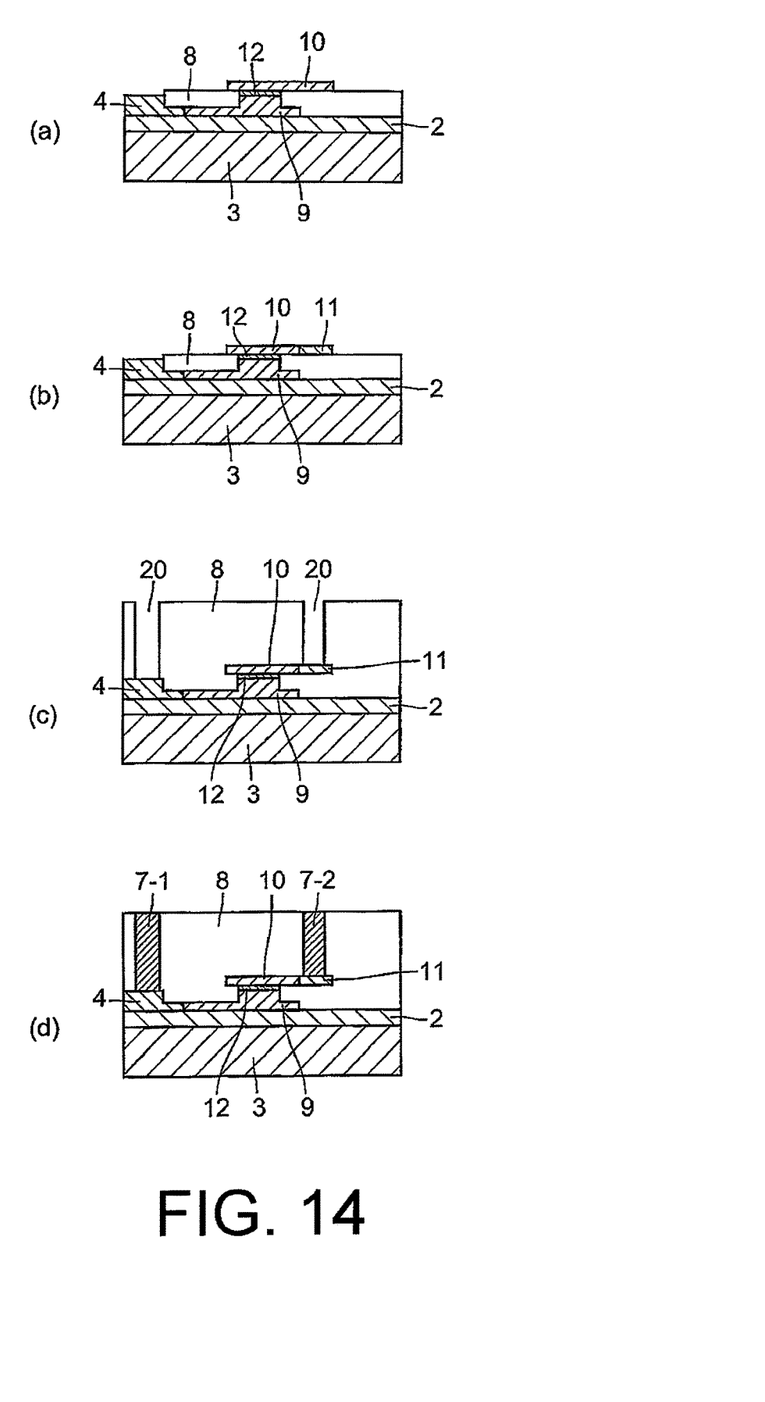
FIG. 14A, FIG. 14B, FIG. 14C, and FIG. 14D are cross-sectional views for illustrating steps following the steps illustrated in FIG. 13A to FIG. 13C.

Next, referring to FIG. 12 to FIG. 14, a method of producing the electro-optic device according to the third embodiment illustrated in FIG. 6 is described.

To describe briefly, in this method, the first silicon semiconductor layer exhibiting the first conductivity type is first processed into the rib waveguide shape. Next, a region adjacent to a slab part of the rib waveguide shape of the first silicon semiconductor layer is doped at a high concentration to form the first electrical contact portion. Next, the relatively thin dielectric layer is formed on the upper surface of the rib part of the rib-type waveguide. Thereafter, the second silicon semiconductor layer that is doped to exhibit the second conductivity type is laminated. Then, a part of the second silicon semiconductor layer is doped at a high concentration to form the second electrical contact portion. Now, details are described.

FIG. 12A is a cross-sectional view of an SOI substrate used to form the electro-optic device. This SOI substrate is formed by laminating a Si layer (9) of from about 100 nm to about 1,000 nm on a buried oxide layer 2, which is formed to be buried in the support substrate 3. In order to reduce the optical loss, a thickness of the buried oxide layer may be 1,000 nm or more. The Si layer on this buried oxide layer 2 may be doped to exhibit the first conductivity type in advance for use as the first silicon semiconductor layer 9. Alternatively, after a surface layer of the Si layer is doped with impurities (phosphorus (P) or boron (B)) by ion implantation or other such methods, heat treatment may be performed so that the Si layer becomes the first silicon semiconductor layer 9 exhibiting the first conductivity type.

Next, as illustrated in FIG. 12B, the laminate structure of an oxide mask 18 and a $SiN_x$ hard mask layer 19 is formed on an upper surface of the first silicon semiconductor layer 9. Then, the oxide mask 18 and the $SiN_x$ hard mask layer 19 are processed to form a mask for forming the rib waveguide shape in the first silicon semiconductor layer 9. In other words, the oxide mask 18 and the $SiN_x$ hard mask layer 19 are patterned into a predetermined shape using UV lithography, a dry etching method, or other such methods.

Next, as illustrated in FIG. 12C, using the oxide mask 18 and the $SiN_x$ hard mask layer 19 as a mask, the first silicon semiconductor layer 9 is patterned to form the rib waveguide shape. As a result, the rib part 141 and the slab parts 142 and 143 are formed. In the third embodiment, at this time, a portion to be the p-type region 4 is left without being etched. Thereafter, an unnecessary region (portion on the right side of FIG. 12C) of the first silicon semiconductor layer 9 is removed to form the second slab part 143. This can be realized by etching using another mask (not shown) or other such methods.

Next, as illustrated in FIG. 13A, a region adjacent to the first slab part 142 of the first silicon semiconductor layer 9 is doped with impurities (for example, B) at a high concentration using the ion implantation method or other such methods to form the p-type region 4. This region includes a region having a height that is equal to that of the rib part 141.

Next, as illustrated in FIG. 13B, an oxide cladding 8 is laminated, and an upper surface of the oxide cladding 8 is flattened by the chemical mechanical polishing (CMP) method.

Next, as illustrated in FIG. 13C, the $SiN_x$ hard mask layer 19 and the oxide mask 18 are removed by treatment with heat phosphoric acid and diluted hydrofluoric acid or other such methods to expose an upper surface of the rib part 141. Subsequently, the relatively thin dielectric layer 12 of from about 5 mm to about 10 nm is formed on the exposed upper surface of the rib part.

Next, as illustrated in FIG. 14A, an n-doped polysilicon layer is laminated as the second silicon semiconductor layer 10. Then, the second silicon semiconductor layer 10 is patterned by the dry etching method or other such methods into a shape having a width that is required for forming the second electrical contact portion 6-2.

Next, as illustrated in FIG. 14B, a part of the second silicon semiconductor layer 10 is doped with impurities at a high concentration using an ion implantation method or other such methods to form the n-type region 11, a part of which is to form the second electrical contact portion 6-2.

Next, as illustrated in FIG. 14C, the oxide cladding 8 is further laminated to about 1 µm. Then, contact holes 20 passing through the oxide cladding 8 to reach the p-type region 4 and the n-type region 11, respectively, are formed by the dry etching method or other such methods. Portions of the p-type region 4 and the n-type region 11 that are exposed in the contact holes 20 become the first and second electrical contact portions 6-1 and 6-2, respectively.

Next, as illustrated in FIG. 14D, a metal layer, which is made of a laminated film of Ti/TiN/Al(Cu), Ti/TiN/W, or the like to fill the contact holes 20, is formed by a spattering method, a CVD method, or other such methods. Then, the formed metal layer is patterned by reactive etching to form the electrode wirings 7-1 and 7-2.

Thereafter, wiring layers (not shown), which are respectively connected to the electrode wirings 7-1 and 7-2, are formed. Those wiring layers are used for connection with a drive circuit (not shown).

As described above, the electro-optic device is completed.

Figure 15:
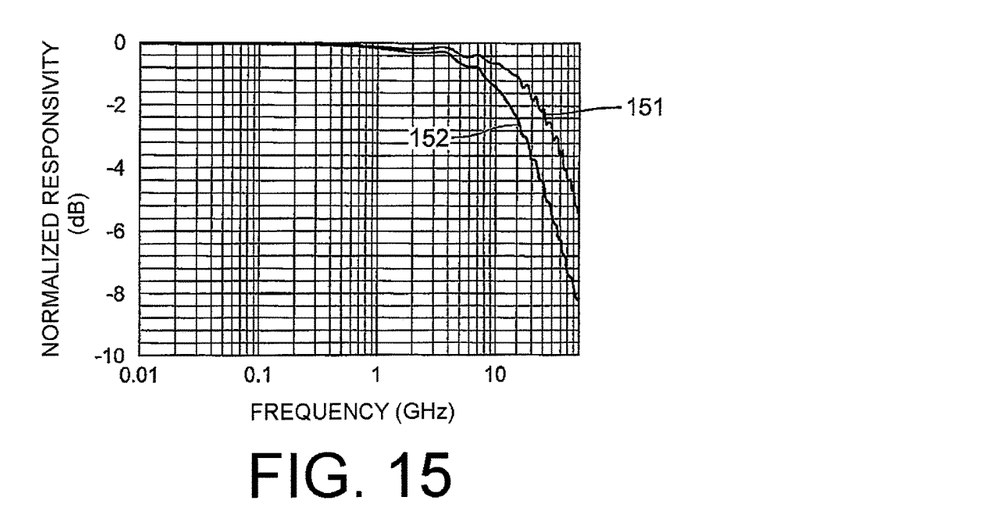
FIG. 15 is a graph for showing dependence of optical modulation characteristics of the electro-optic device according to this invention and the related electro-optic device on a frequency.

FIG. 15 is a graph for showing frequency characteristics 151 of the optical modulation efficiency (normalized responsivity) of the electro-optic device according to the third embodiment. For comparison, in FIG. 15, frequency characteristics 152 of the electro-optic device of FIG. 3 are also shown. With the device according to the third embodiment, the first and second electrical contact portions 6-1 and 6-2 can be formed to have large film thicknesses as compared to the device of FIG. 3. In this manner, a series resistance connected to each of the first and second silicon semiconductor layers 9 and 10 can be reduced. As a result, the RC time constant of the device is reduced, and operation in a frequency band of about 30 GHz can be achieved.

In addition to the above, in order to improve the frequency characteristics, the mobilities and lifetime of the carriers are very important. In particular, the mobilities of the carriers in the polysilicon layer may become a problem in high-speed operation. Therefore, when a polysilicon layer is used as the second silicon semiconductor layer 10, it is effective to increase a particle diameter by recrystallization by annealing, to thereby improve carrier mobilities. Alternatively, it is effective to form the second silicon semiconductor layer using an epitaxial lateral overgrowth (ELO) method or other such methods, to thereby improve crystal quality.

Figure 16:
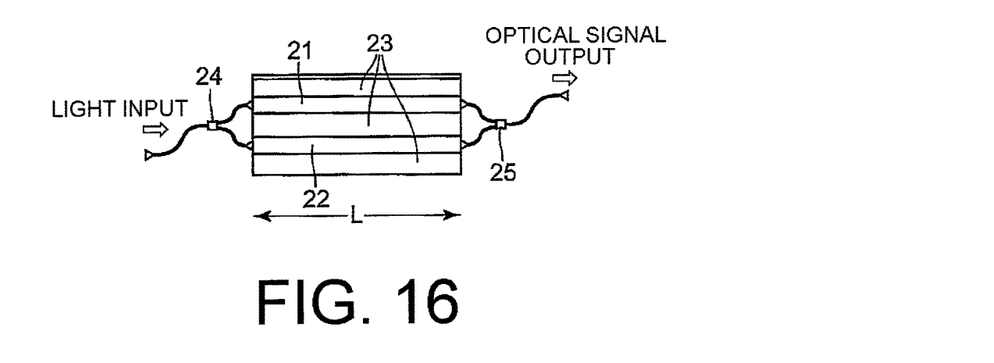
FIG. 16 is a plan view for illustrating one configuration example of an optical intensity modulator of a Mach-Zehnder interferometer type, to which the electro-optic device according to this invention is applied.

FIG. 16 is a view for illustrating one configuration example of an optical intensity modulator of a Mach- Zehnder interferometer type, to which the electro-optic device according to any one of the embodiments of this invention is applied. In this example, as each of a first arm 21 and a second arm 22, which are arranged in parallel, the electro-optic device according to any one of the embodiments of this invention is used. Moreover, this optical intensity modulator includes three driving electrode pads 23, which are arranged along the first arm 21 and the second arm 22.

The center electrode pad of the three electrode pads 23 is connected in common to one of the electrode wirings 7-1 and 7-2 of the electro-optic devices forming the first arm 21 and the second arm 22. The remaining two electrode pads are connected to others of the electrode wirings 7-1 and 7-2 of the electro-optic devices forming the first arm 21 and the second arm 22, respectively.

Further, this optical intensity modulator includes an optical divider 24 coupled to the input side of the first arm 21 and the second arm 22, and an optical coupler 25 coupled to the output side of the first arm 21 and the second arm 22. The optical divider 24 divides an input optical signal into two optical signals so that the optical signals have equal powers, and outputs the two optical signals obtained by the division to the first arm 21 and the second arm 22. The first arm 21 and the second arm 22 perform phase modulation of the optical signals passing therethrough depending on a voltage applied to the electrode pads 23. The optical coupler 25 couples the optical signals that have undergone different phase modulation in the first arm 21 and the second arm 22. In other words, the optical coupler 25 causes phase interference between the optical signals that have passed through the first arm 21 and the second arm 22, to thereby convert the optical signals into a light intensity modulation signal.

For example, it is assumed that a negative voltage is applied to the center electrode pad of the three electrode pads 23, and that a positive voltage and a negative voltage are applied to one and another one of the remaining two electrode pads, respectively. In this case, for example, the carriers are accumulated on both sides of the dielectric layer 12 of the electro-optic device forming the first arm 21 (carrier accumulation mode), and carriers are removed on both sides of the dielectric layer 12 forming the second arm 22 (carrier removal mode). In the carrier accumulation mode, a refractive index sensed by the optical signal field in the electro-optic device becomes smaller. Meanwhile, in the carrier removal (depletion) mode, the refractive index sensed by the optical signal field becomes larger. As a result, a phase difference between the optical signals passing through the arms 21 and 22 is maximized. Moreover, when a negative voltage is applied to all the electrode pads 23, a phase difference between the optical signals passing through the arms 21 and 22 is minimized (ideally becomes zero). The optical coupler 25 multiplexes the optical signals passing through the arms 21 and 22 on the output side. As a result, a light intensity is minimized when the phase difference is maximized, and the light intensity is maximized when the phase difference is minimized. In this manner, the optical intensity modulator achieves light intensity modulation. With the optical intensity modulator using the electro-optic device according to the third embodiment, it has been confirmed that an optical signal of 40 Gbps or more can be transmitted.

The electro-optic device according to this invention is also applicable to, for example, an optical modulator, in which a plurality of optical intensity modulators of the Mach-Zehnder interferometer type are connected in parallel or series to achieve a high transfer rate, or to a matrix optical switch.

This invention has been described above in detail with the use of some embodiments. However, this invention is not limited to the above-mentioned embodiments, and various modifications and alterations may be made thereto.

This application claims priority from Japanese Patent Application No. 2015-071022, filed on Mar. 31, 2015, the entire disclosure of which is incorporated herein by reference.

REFERENCE SIGNS LIST 1 intrinsic semiconductor silicon layer
2 buried oxide film
3 support substrate
4 p-type region (p+-doped semiconductor silicon layer)
5 n-type region (n+-doped semiconductor silicon layer)
6-1 first electrical contact portion
6-2 second electrical contact portion
7-1, 7-2 electrode wiring (metal electrode)
8 oxide cladding
9 first silicon semiconductor layer (p-doped semiconductor silicon)
10 second silicon semiconductor layer (n-doped polysilicon)
11 n-type region (n+-doped polysilicon layer)
12 dielectric layer
13 $Si_{1-x}Ge_x$ (x=0.01 to 0.9) layer
14 $Si_{1-x}Ge_x$ laminated layer
15 composition-modulated $Si_{1-x}Ge_x$ (x=0.01 to 0.9) layer
16 strained $Si_{1-x}Ge_x$ (x=0.01 to 0.9) layer
17 oxidized or nitrided $Si_{1-x}Ge_x$ (x=0.01 to 0.9) layer
18 oxide mask
19 $SiN_x$ hard mask layer
20 contact hole
21 first arm
22 second arm
23 driving electrode pad
24 optical divider
25 optical coupler
101 intrinsic semiconductor region
102, 103 slab region
105 body region
106 (intrinsic semiconductor) silicon layer
107 gate region
108 polysilicon layer
110 rib-type waveguide
111 slab part
141 rib part
142 first slab part
143 second slab part
151 frequency characteristics of electro-optic device according to embodiments of this invention
152 frequency characteristics of related electro-optic device

What is claimed is:
1. An electro-optic device, comprising:
a first semiconductor layer including a rib-type waveguide, which includes a rib part and a first slab part, which extends in a first direction from the rib part, the rib part having a first height, the first slab part having a second height lower than the first height;
a dielectric layer, which is formed on the rib part;

a second semiconductor layer, which extends in a second direction, which is opposite to the first direction, from an upper surface of the dielectric layer;

a first high-concentration impurity region, which is formed in the first semiconductor layer to be in contact with the first slab part on the first direction side; and a second high-concentration impurity region, which is formed in a region of the second semiconductor layer on the second direction side other than a region overlapping the first semiconductor layer in a lamination direction wherein the first semiconductor layer further includes a second slab part, which extends in the second direction from the rib part, the second slab part having the second height, and any high-concentration impurity region being not in contact with the second slab part.

2. An electro-optic device according to claim 1, wherein the second slab part has a length in the second direction of 1 μm or less.

3. An electro-optic device according to claim 1, wherein the first semiconductor layer is of a first conductivity type, and the second semiconductor layer is of a second conductivity type.

4. An electro-optic device according to claim 1, wherein the first semiconductor layer includes a first electrical contact portion which has a height that is equal to the first height of the rib part.

5. An electro-optic device according to claim 1, wherein the rib part has one of a $Si_{1-x}Ge_x$ layer and a strained $Si_{1-x}Ge_x$ layer formed to be at least partially buried therein.

6. An electro-optic device according to claim 5, wherein the $Si_{1-x}Ge_x$ layer comprises one of a laminated layer of a plurality of $Si_{1-x}Ge_x$ layers having different compositions and a composition-modulated $Si_{1-x}Ge_x$ layer having a composition changed in a thickness direction.

7. An electro-optic device according to claim 5, wherein a surface of the $Si_{1-x}Ge_x$ layer is subjected to one of oxidization and nitriding to form at least a part of the dielectric layer.

8. An electro-optic device according to claim 1, wherein the dielectric layer is formed of one of: one kind selected from the group consisting of silicon oxide, silicon nitride, hafnium oxide, zirconium oxide, and a rare earth oxide; and one of an alloy and a laminated film made of at least two kinds thereof.

9. An electro-optic device according to claim 1, wherein the first semiconductor layer and the second semiconductor layer each comprise at least one layer selected from the group consisting of polysilicon, amorphous silicon, strained silicon, single crystal silicon, and $Si_{1-x}Ge_x$.

* * * * *

UNITED STATES PATENT AND TRADEMARK OFFICE
CERTIFICATE OF CORRECTION

PATENT NO. : 10,274,757 B2
APPLICATION NO. : 15/559911
DATED : April 30, 2019
INVENTOR(S) : Junichi Fujikata and Shigeki Takahashi It is certified that error appears in the above-identified patent and that said Letters Patent is hereby corrected as shown below:

In the Specification

Column 8, Line 51; Delete "$\mu_c$" and insert --$\mu_e$-- therefor

Column 11, Line 31; Before "third", delete "forth"

Signed and Sealed this
Twenty-seventh Day of August, 2019

Andrei Iancu
*Director of the United States Patent and Trademark Office*